US008582878B1

(12) United States Patent
Tzur et al.

(10) Patent No.: US 8,582,878 B1
(45) Date of Patent: *Nov. 12, 2013

(54) PURPLE FRINGING AUTOMATIC DETECTION AND CORRECTION

(75) Inventors: Yochay Tzur, Haifa (IL); Dudi Vakrat, Netanya (IL)

(73) Assignee: CSR Technology Inc., Sunnyvale, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 13/206,763

(22) Filed: Aug. 10, 2011

Related U.S. Application Data

(60) Provisional application No. 61/409,875, filed on Nov. 3, 2010.

(51) Int. Cl.
*G06K 9/00* (2006.01)
*G06K 9/40* (2006.01)

(52) U.S. Cl.
USPC .......................................................... 382/167

(58) Field of Classification Search
USPC ......... 382/162, 164, 167, 218, 254, 260–264, 382/268, 269, 274, 275, 298; 358/1.9, 515, 358/518, 523, 525, 529, 530; 348/222.1, 348/241, 294; 345/589, 600–604
See application file for complete search history.

(56) References Cited

U.S. PATENT DOCUMENTS

| | | | |
|---|---|---|---|
| 7,529,405 B2 * | 5/2009 | Masuno et al. | 382/166 |
| 7,577,292 B2 * | 8/2009 | Kang | 382/167 |
| 7,656,437 B2 * | 2/2010 | Yamada et al. | 348/228.1 |
| 7,706,609 B2 | 4/2010 | Bennett et al. | |
| 8,229,217 B2 * | 7/2012 | Fujiwara et al. | 382/167 |
| 8,339,462 B2 | 12/2012 | Stec et al. | |
| 8,379,977 B2 * | 2/2013 | Chuang et al. | 382/167 |
| 2002/0025066 A1 * | 2/2002 | Pettigrew | 382/162 |
| 2005/0001854 A1 * | 1/2005 | Schuster et al. | 345/639 |
| 2007/0097267 A1 | 5/2007 | Sakurai et al. | |
| 2009/0189997 A1 * | 7/2009 | Stec et al. | 348/222.1 |
| 2010/0303350 A1 * | 12/2010 | Demandolx | 382/167 |
| 2012/0106841 A1 * | 5/2012 | Tzur et al. | 382/167 |
| 2012/0308134 A1 | 12/2012 | Zhai et al. | |

OTHER PUBLICATIONS

Kim, Baek-Kyu and Park, Rae-Hong. "Automatic Detection and Correction of Purple Fringing Using the Gradient Information and Desaturation", 16th European Signal Processing Conference (EUSIPCO 2008), Lausanne, Switzerland, Aug. 25-29, 2008.

(Continued)

*Primary Examiner* — Amir Alavi
(74) *Attorney, Agent, or Firm* — Frommer Lawrence & Haug LLP; John W. Branch

(57) ABSTRACT

A system, method, and computer program product for automatically detecting and correcting the "purple fringing" effect, typically due to axial chromatic aberration in imaging devices, are disclosed and claimed. A chromaticity score is computed, denoting the amount of false color related to a purple fringing artifact. A locality score is computed, denoting the similarity of the purple fringing region to a shape of a narrow ridge, which is typical for purple fringing artifacts. A saturation score is also computed, denoting the proximity of a pixel to saturated pixels. These scores are then combined into a detection score, denoting pixels having strong indications they share properties common to pixels of purple fringing artifacts. The detected pixels are then correspondingly corrected, e.g. by chroma suppression. The scoring and correction may be performed over combinations of image resolutions, e.g. an original version and potentially numerous downscaled versions.

20 Claims, 8 Drawing Sheets

(56) References Cited

OTHER PUBLICATIONS

Kang, Sing Bing. "Automatic Removal of Chromatic Aberration From a Single Image", IEEE Conference on Computer Vision and Pattern Recognition, CVPR'07, p. 1-8, Jun. 17-22, 2007.

ChromaFix product by FotoNation (later acquired by Tessera), described at URL <http://www.dcviews.com/press/FotoNation-ChromaFix.htm>, dated Jan. 18, 2008.

Official Communication for U.S. Appl. No. 13/206,788 mailed Feb. 26, 2013.

\* cited by examiner

| | BC (BLUE) AND RC (RED) ALONG EDGE | BC-RC VALUE ALONG EDGE | A | B | V | IS PF? |
|---|---|---|---|---|---|---|
| 1 |  |  | HIGH | LOW | HIGH | YES (E.G. HIGH CONTRAST EDGE WITH PF) |
| 2 |  |  | HIGH | LOW | HIGH | YES (E.G., SMALL FEATURE WITH BLURRED BLUE CHANNEL) |
| 3 |  |  | LOW | LOW | LOW | NO (SKY, SEA, UNIFORM BLUE SURFACE) |
| 4 |  |  | HIGH | HIGH | LOW | NO (BLUE SKY NEAR WHITE CLOUD) |

PURPLE FRINGING AUTOMATIC DETECTION AND CORRECTION

CROSS-REFERENCE TO RELATED APPLICATIONS

This patent application claims priority under 35 U.S.C. 119(e) to U.S. Provisional Application No. 61/409,875 filed on Nov. 3, 2010 in the U.S. Patent and Trademark Office, entitled "Purple Fringing Automatic Detection And Correction", the entire content of which is incorporated by reference herein, and is related by subject matter to another simultaneously-filed application with a common specification, "System And Method for Providing Multi Resolution Purple Fringing Detection and Correction" which is hereby incorporated by reference in its entirety.

BACKGROUND OF THE INVENTION

In optics, axial chromatic aberration is a type of distortion in which there is a failure of a lens to focus all colors to the same focal plane. It occurs because lenses have a different refractive index for different wavelengths of light (i.e. the dispersion of the lens). The refractive index usually decreases with increasing wavelength. Since the focal length of a lens is dependent on the refractive index, different wavelengths of light will be focused on different focal planes. FIG. 1 demonstrates axial chromatic aberration on a typical lens. The side effect of axial chromatic aberration can be seen as a chromatic halo (of false color, typically blue or purple) around objects in the image. This is due to the fact that camera designers usually don't place the sensor in the focal plane of the blue channel, and therefore it will usually be out of focus. However, other channels might be blurred as well.

The term "purple fringing" (PF) refers to the occurrence of regions of severe false color around very bright objects in the image. For that reason purple fringing will normally take place around areas in the image were pixel values are saturated, meaning that their values are at the highest possible value within the dynamic range of the sensor. Purple fringing is commonly explained as an aspect of axial chromatic aberration, although there may be other explanations for this phenomenon.

FIG. 2 explains purple fringing as an aspect of the axial chromatic aberration effect. The dynamic range of the sensor is shown as a gray horizontal bar. A high contrast edge from the photographed scene is projected onto the sensor by the lens (left). As a result of the lens's chromatic aberration, the blue component is defocused and blurred (middle). Finally, the sensor clips all values above its dynamic range, resulting in a blue fringing around the edge (right).

It is important to distinguish the purple fringing artifact from the lateral chromatic aberration artifact, in which the red, green and blue channels are translated across the radial direction (without being blurred).

FIG. 3 shows an example of purple fringing in a real image. It can be seen that all high-contrast edges are surrounded by purple "halo" artifact.

Current solutions to purple fringing are divided into two categories: Pre-capture solutions and post-capture solutions. Pre-capture solutions avoid purple fringing by using high-quality lenses featuring low axial chromatic aberration. These steps, though capable of reducing purple fringing, cannot promise total elimination of the problem. On the other hand, they require special expensive optical equipment.

Real-time post-capture solutions involve applying various filters on the image, such as low pass filters and non-linear filters. Other post-capture approaches are detailed below. Most of these solutions suffer from a lot of artifacts (such as loss of details, chroma blur, undesired chroma suppression) and are incapable of handling wide purple fringing. There are also manual post-capture solutions which are normally time-consuming and unsuitable for digital still or video camera applications.

SUMMARY OF THE EMBODIMENTS

A system, method, and computer program product for automated correction of purple fringing artifacts in images are provided. In one embodiment, the present invention assigns a detection score to pixels in an image according to features indicating the pixels are part of a purple fringing artifact, and corrects the pixels according to the detection score.

In another embodiment, the assigning and correcting are performed on image versions including at least one of an initial image version and at least one downscaled image version. The image versions may include a maximum resolution version. The assigning and/or the correcting may vary for the image versions. The detecting score may be the sum of detecting scores assigned for each image version.

In another embodiment, the detection score is assigned to pixels in an image according to a combination of chromaticity scores, locality scores, and saturation scores. The embodiments may operate substantially in real time and/or within a camera, and the image processed may be a still image and/or a video frame.

The chromaticity score of a pixel may be determined by the difference between a reference color channel and a blurred color channel for the pixel. Alternately, the chromaticity score may be determined by the proximity of a pixel color to a set of purple fringing artifact colors.

The locality score may be determined by the similarity of the purple fringing region to the shape of a narrow ridge in the image. In particular, the locality score may be determined for a target pixel by, for chrominance value differences of individual pixels in a window of predetermined size around the target pixel, extracting a vector of elements along each of a set of sampling directions, averaging a set of differences for a set of sampled pixels near each vector element, for each vector, computing a sum of absolute gradient values, selecting the sampling direction with A being the maximal sum of absolute gradient values, for the selected sampling direction, computing B being an absolute difference for the end vector elements, subtracting B from A to produce a locality value, and converting the locality value to the locality score using a linear scoring function.

The saturation score may be determined by the spatial distance of a pixel from saturated pixels. The saturation score is determined for a target pixel by defining a saturation range, averaging pixels in a window of predetermined size around the target pixel according to their position in the saturation range to produce a saturation value, and converting the saturation value to the saturation score using a linear scoring function.

The detection score may be the multiplicative product of the chromaticity score, the locality score, and the saturation score. Alternately, the detection score may be the minimum of the chromaticity score, the locality score, and the saturation score. Further, the detection score may be a weighted combination of the chromaticity score, the locality score, and the saturation score that emphasizes high individual scores and discounts low individual scores.

The correction may include chroma suppression by blending with a corresponding monochromatic or grey pixel. This grey pixel may be computed by taking the minimum of the red, green, and blue pixel values. Alternately, it can be computed as weighted average of the red, green, and blue pixel values.

As described more fully below, the apparatus and processes of the embodiments disclosed permit automatic detection and correction of purple fringing. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

DETAILED DESCRIPTION OF THE INVENTION

The embodiments of the present invention provide a new approach for post-capture detection and correction of purple fringing, suitable also for real time applications.

The approach provided by the embodiments processes the image as follows. First, each pixel is scanned and scored according to the amount of purple fringing in it. Scoring is done according to at least one of the three measures (chromaticity, locality, and saturation), which may be (but is not necessarily) calculated using a multi-resolution approach.

Second, pixels are corrected according to their purple fringing score, in a way that will reduce their artificial purple color while preserving details as much as possible.

The embodiments of the present invention thus propose a fully automatic solution for detecting and reducing purple fringing artifact from digital images. Some of the advantages over the state of the art are:

A new criterion/mechanism for purple fringing scoring, which relies on locality score (on top of saturation score and, chromaticity score), and exceeds other existing solutions in terms of minimizing mis-detections and false detections of purple fringing.

A new multi-resolution approach for purple fringing scoring, which allows effective removal of wide purple fringing artifacts without suffering from the time and/or cost penalty typical for other solutions using a large spatial filter A new purple fringing correction method which removes false color while maintaining superior detail preservation compared to other existing solutions. This method involves chroma suppression of the purple fringed areas by blending them with the value min(R, G, B).

The embodiments enable manufacturers (of either digital still cameras or digital video recorders) to offer higher image quality in their products. Purple fringing is known as a main factor for degrading the quality of images and videos. They also permit lowering the cost of the camera, by integrating cheaper lenses, which are characterized by higher axial chromatic aberration, while correcting the resulting artifacts digitally.

Acronyms:
PF—Purple Fringing
CHR—Chromaticity
LOC—Locality
SAT—Saturation
BC—Blurry Channel—Normally, but not necessarily, this would be the blue channel.
RC—Reference Channel—Normally, but not necessarily, this would be the red or green channel.
LSF—Linear Scoring Function
DET—Purple fringing detection score
General Processing Scheme As stated above, the present invention embodiments process each pixel in two stages: A "Detection" stage, which produces a "detection score" DET by estimating the pixel purple fringing amount, and a "Correction" stage, in which the pixel is corrected according to the detection score produced at the detection stage.

Figure 4:
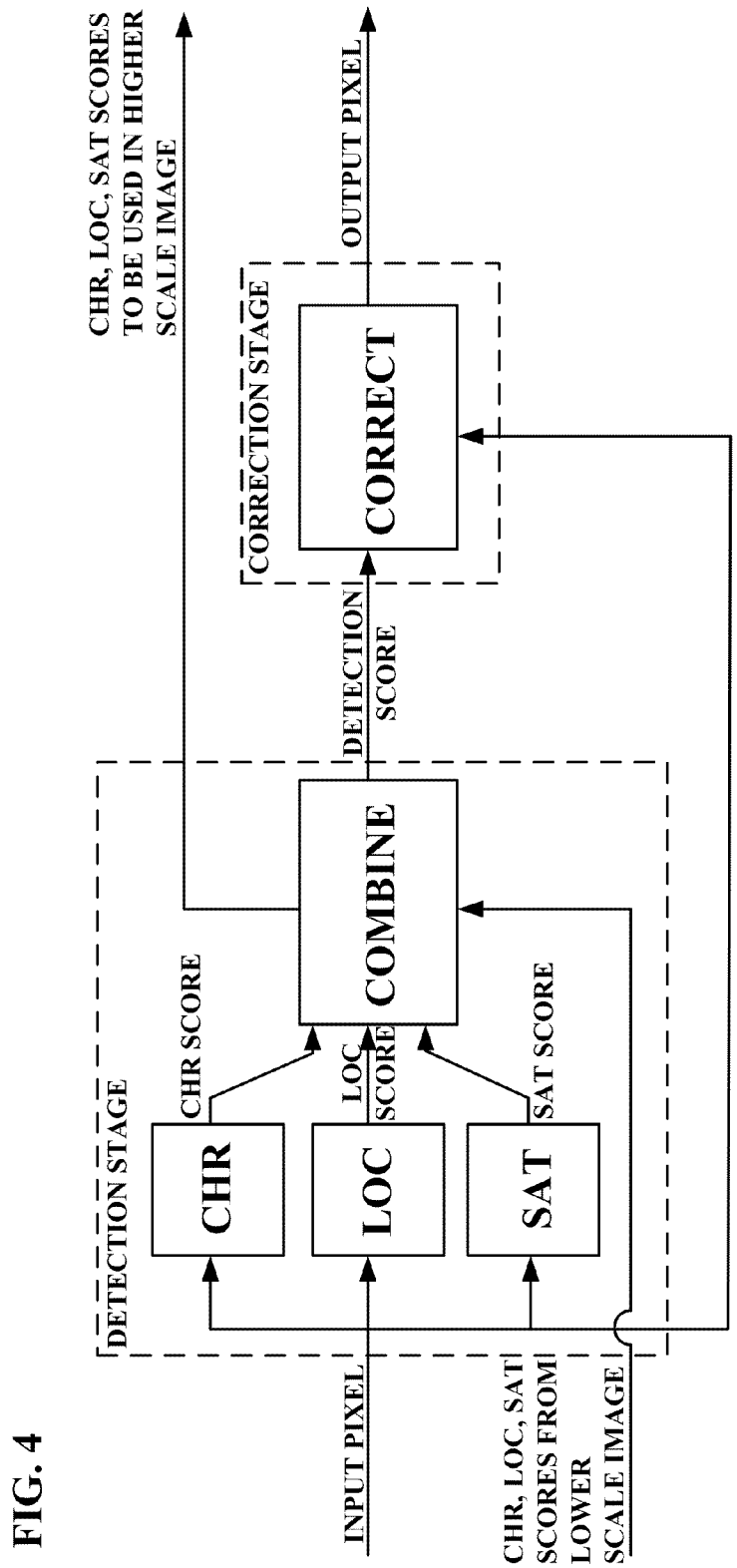
FIG. 4 is a block diagram depicting the operation of an embodiment of the invention.

FIG. 4 shows a block diagram of the conceptual operation of an embodiment of the present invention. The detection stage scores the pixel purple fringing by combining three criteria, which were found to characterize purple fringing pixels very well. These criteria are the Chromaticity score (CHR), the Locality score (LOC) and the Saturation score (SAT). The COMBINE module combines the CHR score, the LOC score and the SAT score and produces a Detection score DET, which is used to determine the amount of correction required at the CORRECT module. The latter is inputted with the original pixel, and performs correction based on the detection score, to produce an output pixel in which the purple fringing is reduced. The scores from a lower scale image are shown generally in FIG. 4 as a further input to the COMBINE module, but these are not required if processing an image at a single resolution (e.g. an original resolution).

Multi-Scale Processing

Figure 5:
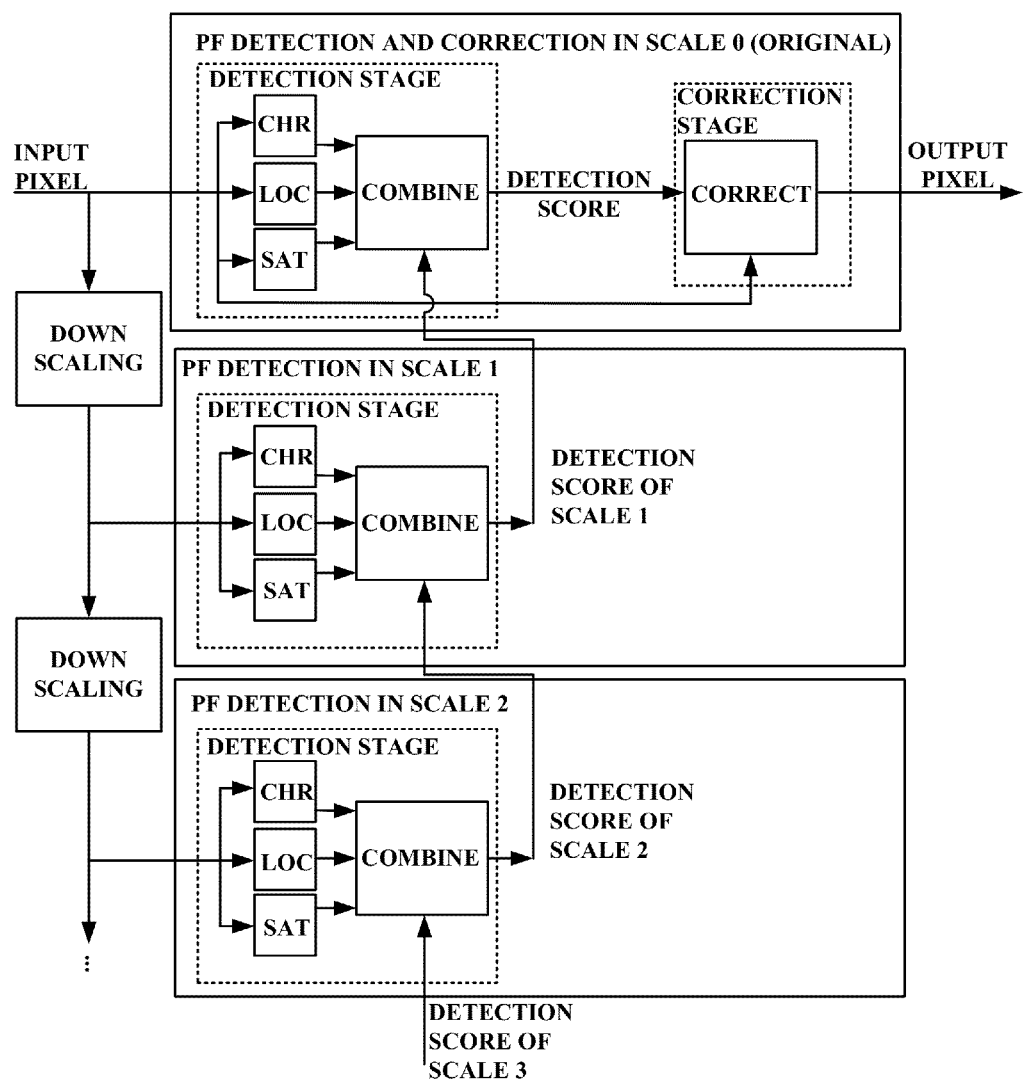
FIG. 5 is a block diagram depicting the operation of a multi-scale embodiment of the invention.

The flow described above is given as a single scale process. However, the concept may be applied to process an image in a multi-scale approach, as shown in FIG. 5. The original image, denoted as $S_0$, is downscaled, possibly repeatedly, to produce at least one lower resolution version of it (denoted as $S_1$, $S_2$ etc). A 1:4 downscaling has been found to work well for example.

When processing image $S_i$, the COMBINE module combines the CHR score, LOC score and SAT score computed on $S_i$ with the scores computed on the corresponding pixel in the downscaled image $S_{i+1}$. The COMBINE module outputs (in addition to the Detection score) the CHR, LOC and SAT score, to be used when processing the upscaled image $S_{i-1}$. This multi-scale computation enables replacing the non-efficient computation of wide-support filters on $S_i$ with narrower support filters computed in $S_{i+1}$.

Linear Scoring Function (LSF)

Figure 6:
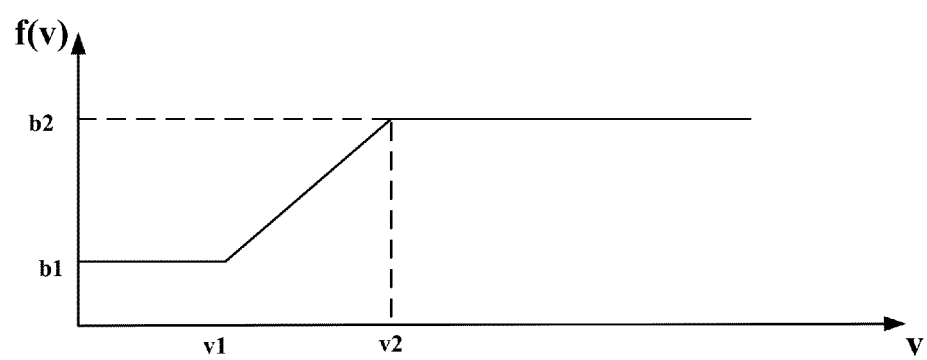
FIG. 6 is a graph of a linear scoring function, according to an embodiment of the invention.

Linear scoring functions are used in several places in the system, to convert a computed measurement into a score. Each LSF is characterized by four parameters: $v_1$, $v_2$, $b_1$, $b_2$, as demonstrated in FIG. 6.

The function is defined by ('o.w' meaning otherwise):

$$f_{v_1,v_2,b_1,b_2}(v) = \begin{cases} b_1 & v <= v_1 \\ b_2 & v >= v_2 \\ b_1 + \frac{v-v_1}{v_2-v_1} \cdot (b_2 - b_1) & o \cdot w \end{cases}$$

The CHR Score

Figure 1:
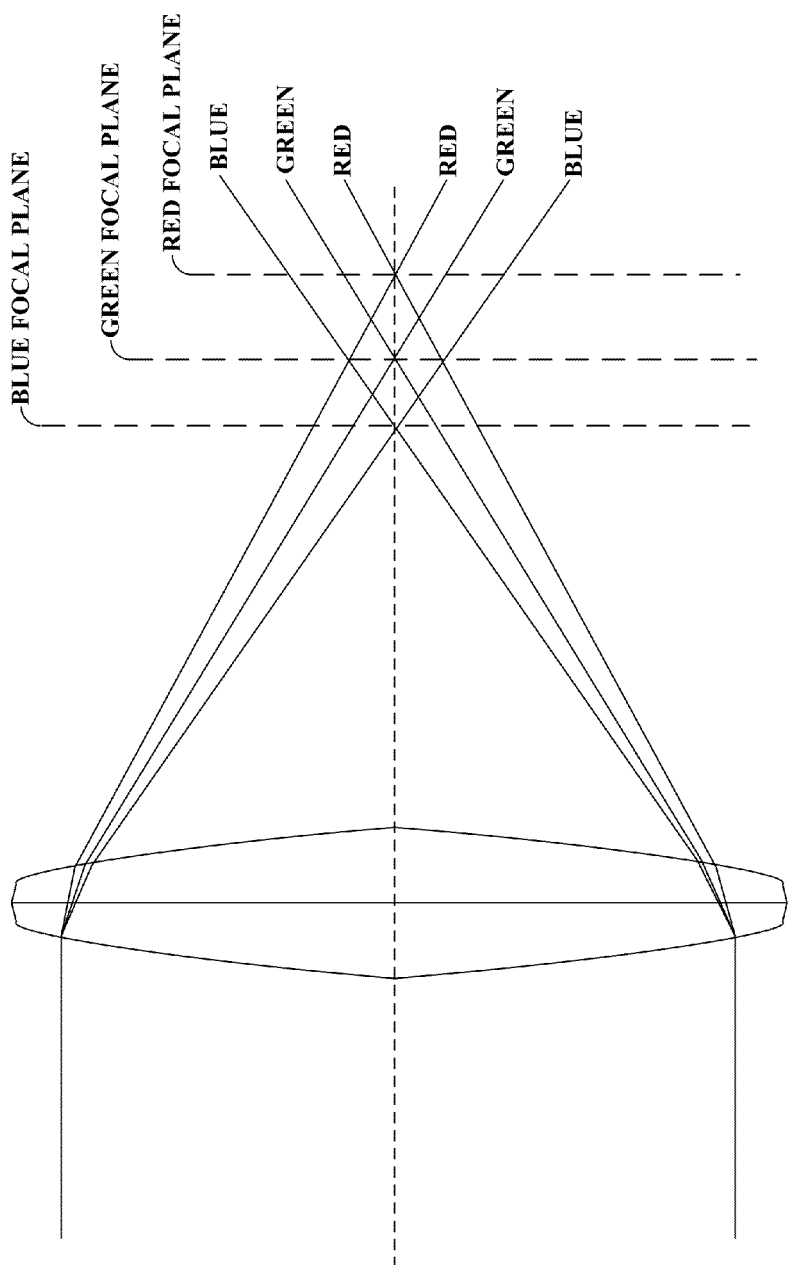
FIG. 1 is a diagram that demonstrates axial chromatic aberration on a typical lens, according to an embodiment of the invention.
Figure 2:
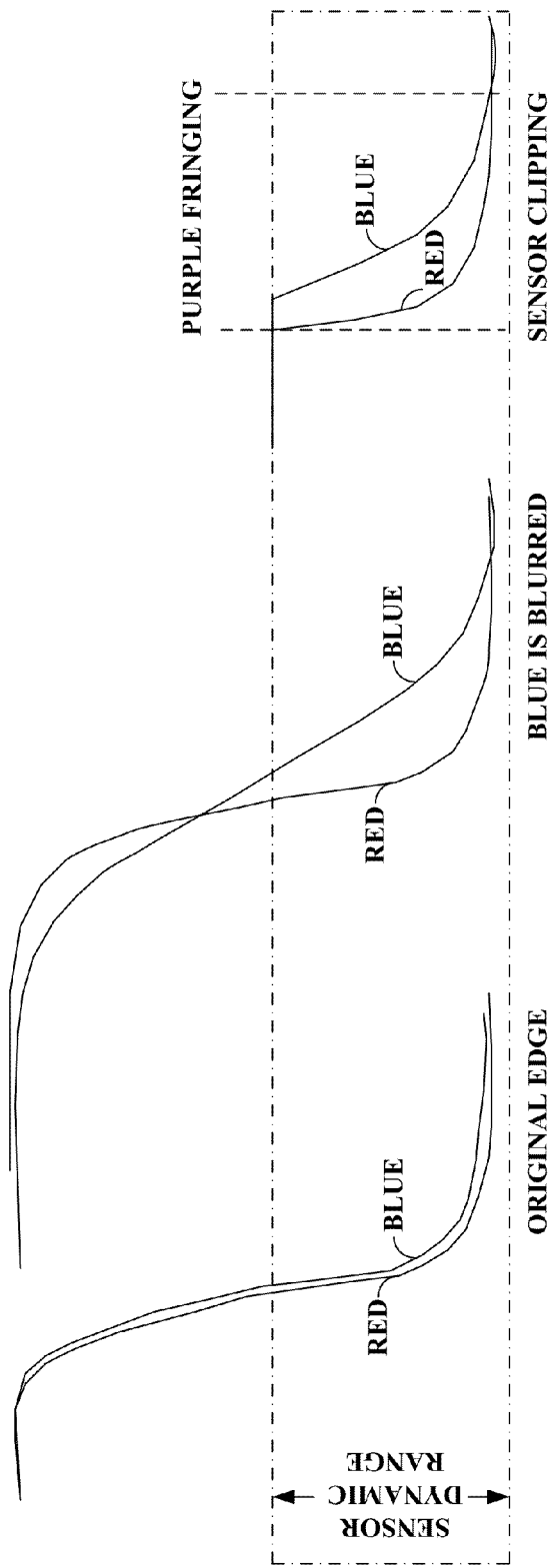
FIG. 2 is a diagram that demonstrates how purple fringing arises as an aspect of the axial chromatic aberration effect and sensor saturation, according to an embodiment of the invention.
Figure 3:
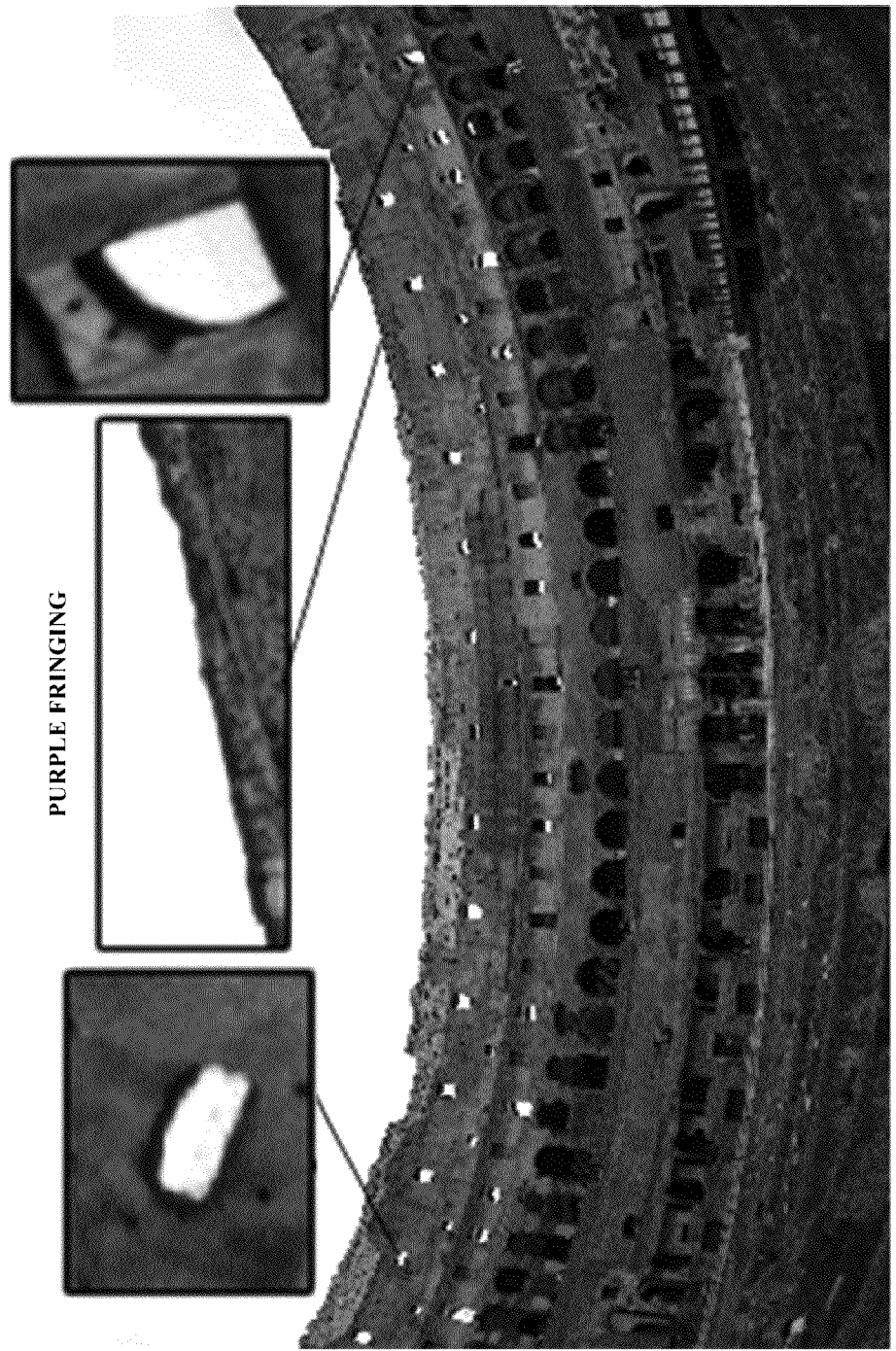
FIG. 3 is a photograph depicting occurrences of purple fringing, according to an embodiment of the invention.

Pixels with purple fringing are characterized by a high-saturated artificial color, which is typically (but not necessarily) purple, blue or cyan. This is a direct outcome of the purple fringing generation process (shown in FIG. 2), in which the blurriness of one component causes it to be much higher than another, sharper component.

The CHR score aims to reflect the similarity between the pixel chrominance and the chrominance which is typical with purple fringing. A preferred implementation for measuring this similarity is to compute the difference between two color channels (when performing detection in the RGB linear domain). Typically these color channels would be the BC and the RC, where a large difference between the BC and the RC is related to the existence of purple fringing, and in this case the pixel will be given a high CHR score.

In order to increase chrominance computation robustness in presence of noise, the computation may involve a spatial filtering (i.e., local averaging).

Another possible implementation may involve measuring the proximity of the pixel color to a set of typical purple fringing colors. For instance, a closed domain in the U-V plane of values which are typical with purple fringing can be defined, and each pixel is scored according to its proximity to the closest pixel in the domain.

The LOC Score

An important property of purple fringing is that it is a local phenomenon, related to high contrast edges in the image, meaning that the false color typical to purple fringing only appears at spatial proximity to these high contrast edges. Therefore, distinguishing true purple fringing pixel from non-purple-fringing pixel with similar color is done by scoring the spatial locality of the artifact. By doing this, the LOC score is used to limit the purple fringing detection to narrow ridges of false color.

Following is a description of a preferred implementation of the LOC score. It should be pointed out that the invention should not be limited to one particular way of calculating the LOC score, and there may very well be other methods for measuring the spatial locality of the false color typical to purple fringing.

According to the preferred implementation, the LOC score is computed in a K×K window around the currently processed pixel as follows. First, the chrominance is computed for all window pixels as described above for CHR score. The K×K window of chrominance values is used from this point on.

Figure 7:
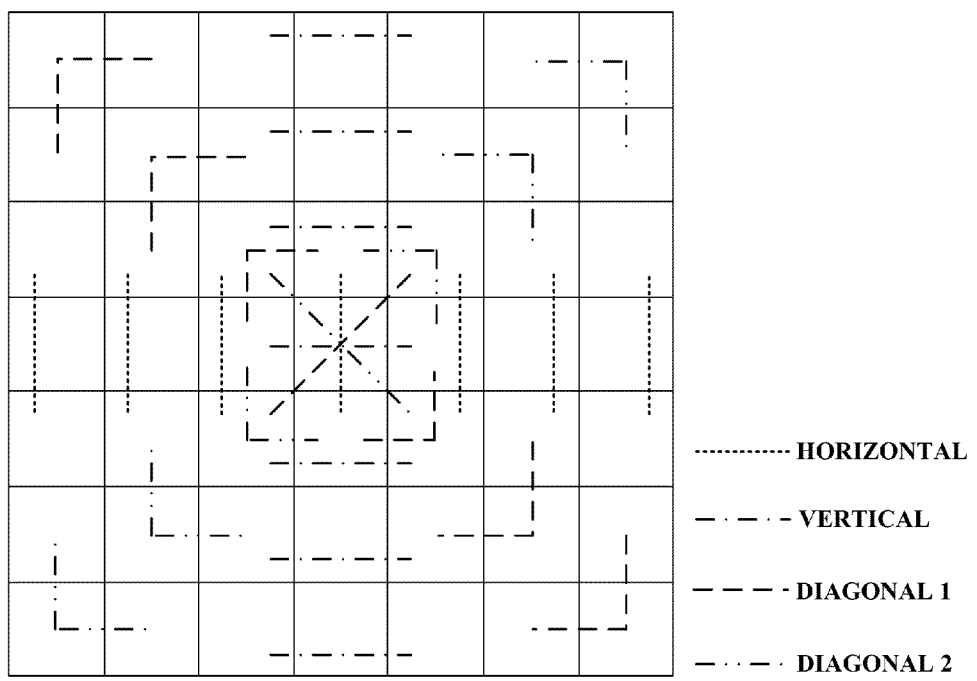
FIG. 7 is a diagram that shows the pixels that should be summed to get each element for spatial locality computation, according to an embodiment of the invention.

For each direction (horizontal, vertical and two diagonals) a vector $S[i]$ ($i \in [0, 1 \ldots K-1]$) is extracted. Each element in $S[i]$ is the mean of three differences in the window. FIG. 7 shows the pixels that should be summed to get each element, for a window of 7×7. For instance, to get the first element $S[0]$ of the first diagonal sampling (going from upper left to lower right in FIG. 7), the three pixels that have to be averaged are the top-left pixel, the pixel below the top-left pixel, and the pixel to the right of the top-left pixel. Similarly, the last sample $S[6]$ of the vertical direction is computed by averaging the value of the three central pixels at the bottom row.

For each of the four K-elements vectors (each vector corresponds to one sampling direction), the sum of the absolute values of the gradients is computed:

$$A = \sum_{i=1}^{K-1} |S[i] - S[i-1]|$$

The direction with the maximal A value is chosen. For this vector, the value $$B = |S[0] - S[K-1]|$$

is computed, and finally the value $$V = A - B$$

is computed and converted to a score using LSF. Notice that given the definitions of A and B, A is always greater than or equal to B.

This specific realization of chrominance locality measurement is explained as follows. The value of A determines the accumulated variability of the signal along a specific direction, accounting all pixels along the sampling direction. The value of B reflects the edge magnitude along the direction in which the signal variability is maximized. The value V=A-B becomes larger as the total variability A is increased (the chrominance varies along the chosen direction) while the edge magnitude is decreased (the chrominance variability is not in the form of an edge). V will have larger values at ridges in the chrominance channel, and smaller values for flat areas (where A and B are both small) and edges (where A and B are both large).

Figure 8:
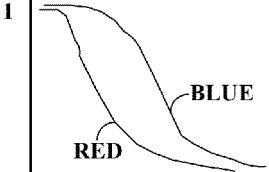
FIG. 8 is a table of different high chromaticity score spatial locality discrimination scenarios, according to an embodiment of the invention.
Figure 8:
Figure 8:
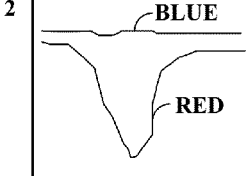
Figure 8:
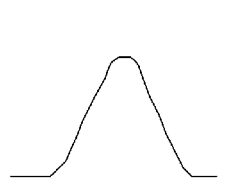
Figure 8:
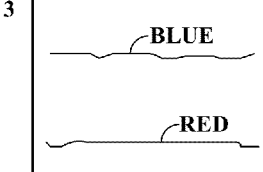
Figure 8:
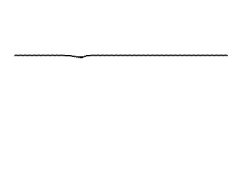
Figure 8:
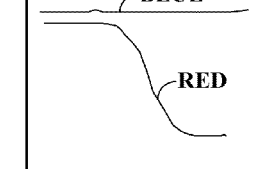
Figure 8:
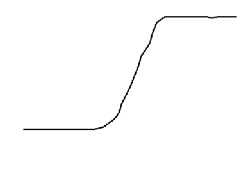

FIG. 8 further demonstrates the behavior of the given locality measurement. In FIG. 8, various cases are listed, all of which are characterized by high chrominance score (for instance, the BC is much higher than the RC). However, not all cases represent a true purple fringing situation. While cases 1 and 2 are true purple fringing, caused by the blurriness of the BC, cases 3 and 4 show non-purple-fringe cases. For each case, the cardinality of A (in the maximal sampling direction) is presented, along with the magnitude of B. Finally, the value of V is given, showing that V is correlated with the existence of true purple fringing.

The SAT Score

The SAT score is used for scoring pixels according to their spatial distance from saturated pixels. Since purple fringing mostly occurs in pixels adjacent to saturated pixels, a higher score is given to pixels located in proximity to saturated areas. As demonstrated in FIG. 2, purple fringing is related to the saturation of the BC, and thus the SAT score is usually (but not necessarily) computed on the BC channel. However, computing the SAT score is not limited to a specific channel, or to the method presented below.

Measuring the environmental saturation may be performed (but is not limited to) as follows. The user defines a "saturation range" [v1 ... v2]—the range of values in which pixels are considered to be saturated. The pixels in a K×K window around the current pixel are averaged according to their position in the saturation range:

$$S = \frac{1}{K^2} \sum \max(\min(pixelValue - v1, v2 - v1), 0)$$

The value S is then converted to SAT score using a scoring LSF.

The above method for computing SAT is explained as follows. For a pixel located in proximity to a saturated area, there will be at least a few pixels in a K×K window around the pixel for which their value is in the range [v1 ... v2]. The value of S in this window will be greater than zero, and will get larger as the K×K window contains more pixels with value in [v1 ... v2], and/or the actual value of the pixels is larger. On the other hand, for a pixel which is not located in a proximity to a saturated area, all pixels in the K×K window around the pixel will have their values smaller than v1, and thus S=0. Notice that this definition of S promises smoothness in the spatial transition of the SAT score.

Score Combination

This section describes the combination of the three scores listed above by the system. However, a different method of combination can be applied as well. As stated above, the system performs purple fringing detection in a multi-scale scheme. In the following explanation, scale 0 represents the original image, while scales 1, 2 and beyond use lower resolution versions of the original image. The image for scale i+1 might be computed by down-scaling the image of scale I (other methods can be applied as well).

Given the following scores:

$CHR_i$=CHR score computed on input pixel from current image $SAT_i$=SAT score computed on input pixel from current image $LOC_i$=LOC score computed on input pixel from current image $CHR_{i+1}$=CHR score computed on corresponding pixel from downscaled image $SAT_{i+1}$=SAT score computed on corresponding pixel from downscaled image $LOC_{i+1}$=LOC score computed on corresponding pixel from downscaled image For a single scale i, a possible combination of the chromaticity score $CHR_i$, the locality score $LOC_i$ and the saturation score $SAT_i$ into a detection score $DET\_SCALE_i$ may be (but is not limited to) performed as follows:

$$DET\_SCALE_i = CHR_i * LOC_i * SAT_i$$

This computation becomes larger as each of the three scores is increased. If at least one of the scores equals zero, the computed score is also zeroed.

In order to perform a multi-scale detection, the system might compute the final detection score at scale i, denoted $DET_i$, by combining the detection score in scale i, $DET\_SCALE_i$ with the final detection score computed in lower scales. A possible combination is given by (but not limited to):

$$DET_i = DET\_SCALE_i + DET_{i+1}$$

Where $DET_{i+1}$ is the combination of the scores for scale i+1, which might be computed in a similar method, and combines $CHR_{i+1}$, $LOC_{i+1}$, and $SAT_{i+1}$. However, the combination of the scores in each scale may be different from other scale combination methods.

It should be noted that the combinations of the scores may be implemented in different ways. For instance, rather than multiplying the CHR, LOC and SAT scores, the minimum of the scores may be used. Similarly, the addition of $DET\_SCALE_1$ and $DET_{i+1}$ may be alternated by computing the score's maximum. Low component score values may be dropped, or higher component scores may be weighted non-linearly to make them more significant. Scores may also be computed serially rather than in parallel and then combined.

Correction

The correction stage of the system aims to reduce the purple fringing in the current pixel (if presented). The correction is performed gradually, using the Detection score as correction amount. The correction process replaces the original pixel with a pixel in which the artificial color is reduced.

Following is a description of a preferred implementation for correcting purple fringing pixels. It should be pointed out that the invention should not be limited to one particular way of correction, and there may be other methods for reducing purple fringing, based on the computed detection score.

Given the original pixel and the purple fringing detection score, the system performs chroma suppression on the current pixel, by partially blending the pixel with a corresponding grey pixel (denoted M). As a grey pixel corresponding to the original pixel, the system uses the minimum of the Red, Green and Blue pixel components:

$$M = \min(R, G, B)$$

It is believed that using the minimum of Red, Green and Blue pixel components as the grey pixel for partially blending with the original pixel is better in detail preservation than other methods.

Once the grey pixel is computed from the current pixel, a blending of the current pixel with the grey pixel is performed:

$$R_{corrected} = (1-D) \cdot R + D \cdot M$$

$$G_{corrected} = (1-D) \cdot G + D \cdot M$$

$$B_{corrected} = (1-D) \cdot B + D \cdot M$$

Where D represents the normalized detection score. D ranges from 0 to $D_{max}$, where $D_{max} \leq 1$. D equals 0 when the detection score is 0, and equals to $D_{max}$ when the detection score gets its maximal value.

It should be noted that the invention does not limit the computation of the grey pixel M to this method. Alternative methods might involve computing the grey pixel M as a weighted average of the Red, Green, and Blue pixel components (when processing in RGB domain), and using the Y (luma) component of the image (when processing in YUV domain).

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be tangibly stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, a radio frequency (RF) link, etc. User input may include any combination of a keyboard, mouse, touch screen, voice command input, etc. User input may similarly be used to direct a browser application executing on a user's computing device to one or more network resources, such as web pages, from which computing resources may be accessed.

While the invention has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. An automated image correction method, comprising:
    assigning a detection score to pixels in an image according to locality scores indicating the pixels are part of a purple fringing artifact such that the locality score of each pixel is based, at least in part, on a spatial proximity of the pixel to a high-contrast edge;
    correcting the pixels according to the detection score; and
    outputting a corrected image.

2. The method of claim 1, wherein the method operates at least one of substantially in real time and within a camera.

3. The method of claim 1, wherein the image is at least one of a still image and a video frame.

4. The method of claim 1, wherein the correcting includes chroma suppression by blending with a monochrome pixel.

5. The method of claim 1, wherein the correcting includes blending each component color with an average RGB color value.

6. The method of claim 1 wherein the assigning is according to, in addition to the locality scores, at least one of chromaticity scores and saturation scores, indicating the pixels are part of a purple fringing artifact.

7. The method of claim 6, wherein the chromaticity score of a pixel is determined by the difference between a reference color channel and a blurred color channel for the pixel.

8. The method of claim 6, wherein the chromaticity score of a pixel is determined by the proximity of a pixel color to a set of purple fringing artifact colors.

9. The method of claim 6, wherein the saturation score of a pixel is determined by the spatial distance of the pixel from saturated pixels.

10. The method of claim 6, wherein the detection score is the multiplicative product of the chromaticity score, the locality score, and the saturation score.

11. The method of claim 6, wherein the detection score is the minimum of the chromaticity score, the locality score, and the saturation score.

12. The method of claim 6, wherein the detection score is a weighted combination of the chromaticity score, the locality score, and the saturation score that emphasizes high individual scores and discounts low individual scores.

13. An automated image correction method, comprising:
    assigning a detection score to pixels in an image according to locality scores indicating the pixels are part of a purple fringing artifact;
    correcting the pixels according to the detection score; and
    outputting a corrected image, wherein the locality scores emphasize target pixels with neighboring pixels that (a) are each in a window of predetermined size around the target pixel and (b) have features indicating the neighboring pixels are part of a purple fringing artifact.

14. An automated image correction method, comprising:
    assigning a detection score to pixels in an image according to locality scores indicating the pixels are part of a purple fringing artifact;
    correcting the pixels according to the detection score; and
    outputting a corrected image, wherein the locality scores are determined by the similarity of the purple fringing artifact to the shape of a narrow ridge.

15. The method of claim 14, wherein the locality score is determined for a target pixel by, for chrominance value differences of individual pixels in a window of predetermined size around the target pixel:
    extracting a vector of elements along each of a set of sampling directions;
    averaging a set of differences for a set of sampled pixels near each vector element;
    for each vector, computing a of absolute gradient values;
    selecting the sampling direction with A being the maximal sum of absolute gradient values;
    for the selected sampling direction, computing B being an absolute difference for the end vector elements;
    subtracting B from A to produce a locality value; and
    converting the locality value to the locality score using a linear scoring function.

16. An automated image correction method, comprising:
    assigning a detection in an image according to locality scores indicating the pixels are part of a purple fringing artifact;
    correcting the pixels according to the detection score; and
    inputting a corrected image, wherein the correcting includes, for each pixel, chroma suppression by blending with a minimum ROB color value, wherein the minimum RGB color value is the minimum value from among the R value, the G value, and the B value of the pixel.

17. An automated image correction method, comprising:
assigning a detection score to pixels in an image according to locality scores indicating the pixels are part of a purple fringing artifact;
correcting the pixels according to the detection score; and
outputting a corrected image, wherein the assigning is according to, in addition to the locality scores, saturation scores, indicating, the pixels are part of a purple fringing artifact, and wherein the saturation score for a target pixel is determined by:
defining a saturation range;
averaging pixels in a window of predetermined size around the target pixel according to their position in the saturation range to produce a saturation value; and
converting the saturation value to the saturation score using a linear scoring function.

18. An automated image correction system, comprising:
at least one processor that is configured to:
assign a detection score to pixels in an image according to a locality score indicating the pixels are part of a purple fringing artifact such that the locality score of each pixel is based, at least in part, on a spatial proximity of the pixel to a high-contrast edge;
correct the pixels according to the detection score; and
output a corrected image.

19. A computer program product for automated image correction, comprising a computer-readable medium tangibly embodying non-transitory program instructions thereon that, when executed cause a computer to:
assign a detection score to pixels in an image according to a locality score indicating the pixels are part of a purple fringing artifact such that the locality score of each pixel is based, at least in part, on a spatial proximity of the pixel to a high-contrast edge;
correct the pixels according to the detection score; and
output a corrected image.

20. An automated image correction system, comprising:
means for assigning a detection score to pixels in an image according to a locality score indicating the pixels are part of a purple fringing artifact such that the locality score of each pixel is based, at least in part, on a spatial proximity of the pixel to a high-contrast edge;
means for correcting the pixels according to the detection score; and
means for outputting a corrected image.

* * * * *

UNITED STATES PATENT AND TRADEMARK OFFICE
CERTIFICATE OF CORRECTION

PATENT NO. : 8,582,878 B1  
APPLICATION NO. : 13/206763  
DATED : November 12, 2013  
INVENTOR(S) : Yochay Tzur et al.

Page 1 of 1

It is certified that error appears in the above-identified patent and that said Letters Patent is hereby corrected as shown below:

In the Specification

In Column 7, Line 41, delete "image" and insert -- image. --, therefor.

In Column 7, Line 54, delete "DET_SCALE$_i$;" and insert -- DET_SCALE$_i$, --, therefor.

In Column 8, Line 1, delete "DET_SCALE$_1$" and insert -- DET_SCALE$_i$ --, therefor.

In the Claims

In Column 9, Line 64, in Claim 6, delete "1" and insert -- 1, --, therefor.

In Column 10, Line 48, in Claim 15, delete "a of" and insert -- a sum of --, therefor.

In Column 10, Line 58, in Claim 16, delete "detection in" and insert -- detection score to pixels in --, therefor.

In Column 10, Line 62, in Claim 16, delete "inputting" and insert -- outputting --, therefor.

In Column 10, Line 64, in Claim 16, delete "ROB" and insert -- RGB --, therefor.

In Column 11, Line 8, in Claim 17, delete "indicating," and insert -- indicating --, therefor.

Signed and Sealed this  
Second Day of September, 2014

Michelle K. Lee  
*Deputy Director of the United States Patent and Trademark Office*